US012314220B2

(12) United States Patent
Fan et al.

(10) Patent No.: US 12,314,220 B2
(45) Date of Patent: May 27, 2025

(54) DATA SELECTION FOR MULTI-PHASE FILE-BASED DATA MIGRATION

(71) Applicant: Dell Products L.P., Round Rock, TX (US)

(72) Inventors: Huijuan Fan, Chengdu (CN); Junhua Shao, Chengdu (CN); Shuang Zheng, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 18/106,005

(22) Filed: Feb. 6, 2023

(65) Prior Publication Data

US 2024/0176761 A1 May 30, 2024

(30) Foreign Application Priority Data

Nov. 28, 2022 (CN) .......................... 202211502668.7

(51) Int. Cl.
*G06F 16/11* (2019.01)
*G06F 16/16* (2019.01)
*G06F 16/178* (2019.01)
*G06F 16/182* (2019.01)

(52) U.S. Cl.
CPC ............ *G06F 16/119* (2019.01); *G06F 16/11* (2019.01); *G06F 16/16* (2019.01); *G06F 16/178* (2019.01); *G06F 16/1827* (2019.01)

(58) Field of Classification Search
CPC .... G06F 16/1827; G06F 16/119; G06F 16/11; G06F 16/16; G06F 16/178
USPC ......................................... 707/624, 636, 822
See application file for complete search history.

(56) References Cited

U.S. PATENT DOCUMENTS

| | | | |
|---|---|---|---|
| 2013/0060673 A1* | 3/2013 | Shah ...................... | G06Q 40/04 705/37 |
| 2020/0226684 A1* | 7/2020 | Weng ...................... | G06Q 40/04 |
| 2021/0303466 A1* | 9/2021 | Kondiles ............... | G06F 16/221 |
| 2022/0129167 A1* | 4/2022 | Chen ....................... | G06F 3/0647 |
| 2022/0197559 A1* | 6/2022 | Chen ....................... | G06F 3/067 |

(Continued)

OTHER PUBLICATIONS

Dell Technologies, "Dell EMC Unity: Migration Technologies," Technical White Paper, H15163.9, A Detailed Review, Jun. 2021, 54 pages.

(Continued)

*Primary Examiner* — Shahid A Alam
(74) *Attorney, Agent, or Firm* — Ryan, Mason & Lewis, LLP

(57) ABSTRACT

An apparatus comprises a processing device configured to determine, for a given time period corresponding to an expected duration of a multi-phase file-based data migration from a source to a destination storage system, predicted write access count metrics for a plurality of files to be migrated as part of the multi-phase file-based data migration and to select, based at least in part on the predicted write access count metrics, first and second subsets of the plurality of files for migration during first and second phases of the multi-phase file-based data migration. The processing device is also configured to migrate the first subset of the plurality of files during the first phase of the multi-phase file-based data migration, and to migrate the second subset of the plurality of files during the second phase of the multi-phase file-based data migration.

20 Claims, 11 Drawing Sheets

(56) References Cited

U.S. PATENT DOCUMENTS

2022/0342578 A1\* 10/2022 Chen ................ G06F 3/0605
2022/0413967 A1\* 12/2022 Bhagi ............... G06F 16/21

OTHER PUBLICATIONS

Dell EMC, "Dell EMC FluidFS Migration Guide," White Paper, Feb. 2018, 74 pages.
A. Canziani et al., "An Analysis of Deep Neural Network Models for Practical Applications," arXiv:1605.07678v4, Apr. 14, 2017, 7 pages.

\* cited by examiner

DATA SELECTION FOR MULTI-PHASE FILE-BASED DATA MIGRATION

RELATED APPLICATION

The present application claims priority to Chinese Patent Application No. 202211502668.7, filed on Nov. 28, 2022 and entitled "Data Selection for Multi-Phase File-Based Data Migration," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input/output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for selecting data to be migrated during different phases of a multi-phase file-based data migration between source and destination storage systems.

In one embodiment, an apparatus comprises at least one processing device comprising a processor coupled to a memory. The at least one processing device is configured to perform the steps of determining, for a given time period corresponding to an expected duration of a multi-phase file-based data migration from a source storage system to a destination storage system, predicted write access count metrics for a plurality of files to be migrated as part of the multi-phase file-based data migration and selecting, based at least in part on the predicted write access count metrics, a first subset of the plurality of files for migration during a first phase of the multi-phase file-based data migration and a second subset of the plurality of files for migration during a second phase of the multi-phase file-based data migration. The at least one processing device is also configured to perform the steps of migrating the selected first subset of the plurality of files during the first phase of the multi-phase file-based data migration, and migrating the selected second subset of the plurality of files during the second phase of the multi-phase file-based data migration.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
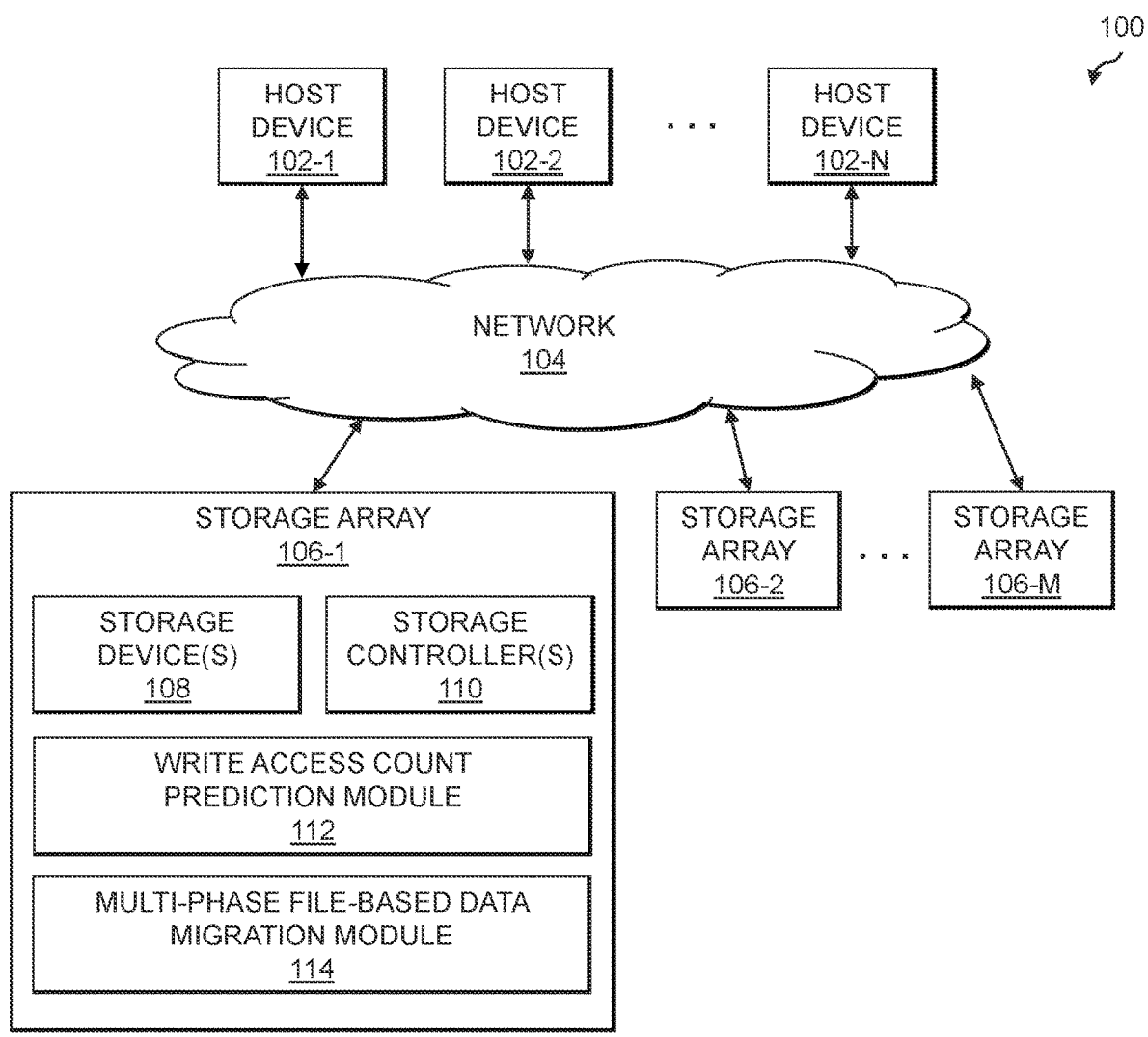
FIG. 1 is a block diagram of an information processing system configured for multi-phase file-based data migration in an illustrative embodiment.

FIG. 1 shows an information processing system 100 configured in accordance with an illustrative embodiment to provide functionality for selecting data to be migrated during different phases of a multi-phase file-based data migration. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (IO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input/output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations (e.g., as part of storage workloads of one or more applications running on the host devices 102) to be processed by the storage cluster.

In some embodiments, the storage cluster or at least one of the storage arrays 106 that are part of the storage cluster are assumed to provide functionality for file-based data migration (e.g., between source and destination ones of the storage arrays 106, between a source one of the storage arrays 106 and an external destination such as cloud storage, etc.). At least one of the storage controllers of the storage arrays 106 (e.g., the storage controller 110 of storage array 106-1) is assumed to implement functionality for intelligently predicting write access counts for files during a time period in which the file-based data migration will take place, and to intelligently select which files to include in baseline and incremental copies based at least in part on the predicted write access counts. Such functionality is provided via a write access count prediction module 112 and a multi-phase file-based data migration module 114.

The write access count prediction module 112 is configured to analyze multiple factors to evaluate and predict write access counts for files in future time periods (e.g., a future time period corresponding to an expected duration of a file-based data migration between a source and a destination). Such multiple factors include historical write access counts for the files and additional information such as, for example, read access counts for the files, write and read access counts for the parent directories of the files, file extension or file type, user-defined priorities, etc.

The multi-phase file-based data migration module 114 is configured to utilize the predicted write access counts to select which files should be migrated in different phases of a multi-phase file-based data migration process. The multi-phase file-based data migration process may include, for example, a baseline copy phase and an incremental copy phase. The predicted write access counts are used to categorize the files in accordance with a dynamic threshold window. In some embodiments, the files may be categorized into "cold" files, "relatively cold" files, "relatively hot" files and "hot" files. The cold files may be selected for inclusion in a baseline copy used during the baseline copy phase, while the hot files are selected for inclusion in an incremental copy used during the incremental copy phase. The relatively cold and relatively hot files are split among the baseline copy and the incremental copy based on ranking their associated predicted write access counts and filling the baseline copy to some designated size threshold.

Although in the FIG. 1 embodiment the write access count prediction module 112 and the multi-phase file-based data migration module 114 are shown as being implemented internal to the storage array 106-1 and outside the storage controllers 110, in other embodiments one or both of the write access count prediction module 112 and the multi-phase file-based data migration module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of one or both of the write access count prediction module 112 and the multi-phase file-based data migration module 114.

At least portions of the functionality of the write access count prediction module 112 and the multi-phase file-based data migration module 114 may be implemented at least in part in the form of software that is stored in memory and executed by a processor.

As noted above, the storage arrays 106 in some embodiments are assumed to be part of a storage cluster. The storage cluster is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 9 and 10.

It is to be understood that the particular set of elements shown in FIG. 1 for implementing multi-phase file-based data migration is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
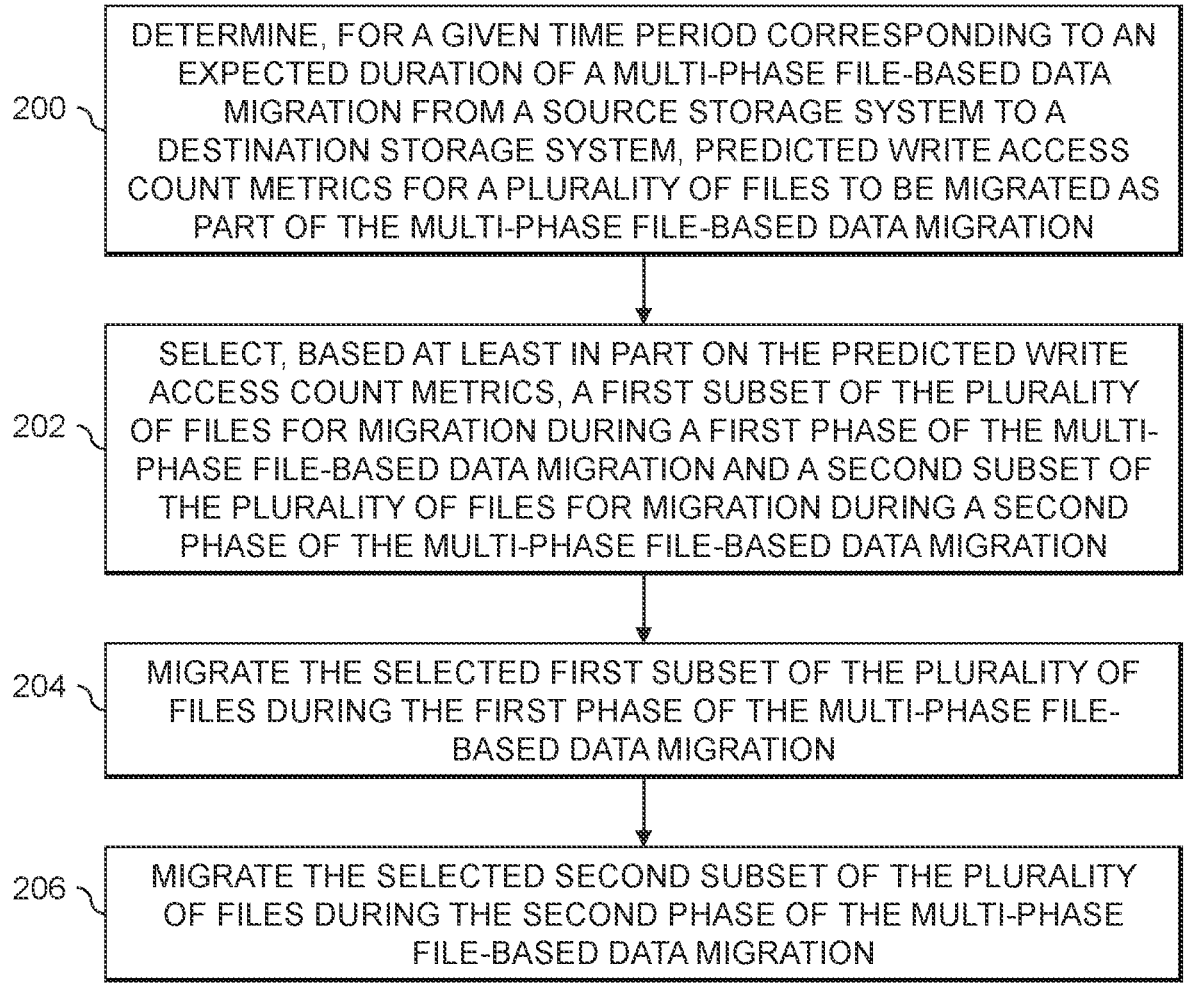
FIG. 2 is a flow diagram of an exemplary process for selecting data to be migrated during different phases of a multi-phase file-based data migration between source and destination storage systems in an illustrative embodiment.

An exemplary process for selecting data to be migrated during different phases of a multi-phase file-based data migration between source and destination storage systems will now be described in more detail with reference to the flow diagram of FIG. 2. It is to be understood that this particular process is only an example, and that additional or alternative processes for selecting data to be migrated during different phases of a multi-phase file-based data migration between source and destination storage systems may be used in other embodiments.

In this embodiment, the process includes steps 200 through 206. These steps are assumed to be performed by the write access count prediction module 112 and the multi-phase file-based data migration module 114. The process begins with step 200, determining, for a given time period corresponding to an expected duration of a multi-phase file-based data migration from a source storage system to a destination storage system, predicted write access count metrics for a plurality of files to be migrated as part of the multi-phase file-based data migration. The first phase of the multi-phase file-based data migration may comprise a baseline copy phase and the second phase of the multi-phase file-based data migration may comprise an incremental copy phase. During the incremental copy phase, write access requests may be synchronized in the source storage system and the destination storage system.

Determining the predicted write access count metrics in step 200 may comprise utilizing a deep neural network model comprising two or more hidden layers. The predicted write access count metrics may be determined based at least in part on: (i) correlations between file read and write access; (ii) correlations between files and associated parent directories; and (iii) file type. Determining the predicted write access count metrics may be based at least in part on: read and write access count metrics for the plurality of files in a historical time period (e.g., where a duration of the historical time period is the same as a duration of the given time period); read and write access counts for parent directories of the plurality of files in the historical time period; file name extensions of the plurality of files; and user-defined priorities of the plurality of files.

In step 202, a first subset of the plurality of files is selected for migration during a first phase of the multi-phase file-based data migration and a second subset of the plurality of files is selected for migration during a second phase of the multi-phase file-based data migration, the selection of the first and second subsets being based at least in part on the predicted write access count metrics determined in step 200. The selected first subset of the plurality of files are migrated during the first phase of the multi-phase file-based data migration in step 204, and the selected second subset of the plurality of files are migrated during the second phase of the multi-phase file-based data migration in step 206.

Step 204 may comprise splitting the plurality of files into two or more different categories based on one or more threshold values. The two or more different categories may comprise: a first file category comprising files having predicted write access count metrics in the given time period below a first one of the one or more threshold values; a second file category comprising files having predicted write access count metrics in the given time period above a second one of the one or more threshold values; and a third file category comprising files having predicted write access count metrics in the given time period between the first threshold value and the second threshold value. Files in the first file category are selected for inclusion in the first subset and files in the second file category are selected for inclusion in the second subset. The one or more threshold values may further comprise a third threshold value corresponding to a maximum size of the first subset of the plurality of files. Responsive to a total size of the files in the first file category being less than the third threshold value, one or more of the files in the third file category are selected for inclusion in the first subset. The one or more files in the third file category selected for inclusion in the first subset may be selected based at least in part on ranking the predicted write access count metrics for the files in the third file category. Any remaining files in the third file category which are not selected for inclusion in the first subset may be included in the second subset.

Data is an important asset for various entities, from small businesses to enterprise class organizations. Data can be leveraged to understand the past and predict the future. Data migration may be required when tech refresh happens, and making sure data is intact is critical. When considering data migration technologies, many factors are considered. Compared with block-based data migration, file-based data migration is more complicated (e.g., since network attached storage (NAS) environments are more complex). Filesystem based data, however, is well organized and can be correlated. Illustrative embodiments provide technical solutions for file-based data migration which can shorten the overall duration of a data migration operation while avoiding unnecessary traffic on the network. The technical solutions can also avoid unnecessarily complex logic during an incremental copy phase of the file-based data migration process.

A file-based data migration process may include a baseline copy phase and an incremental copy phase. The technical solutions described herein provide a more accurate way of evaluating file "hotness" utilizing machine learning (e.g., a deep neural network (DNN) model) and by considering more detailed file behavior metrics. A dynamic threshold window is established based on file write access count thresholds and a total sum size threshold percentage of files for a baseline copy to intelligently select "cold" and "relatively cold" files or filesystems for inclusion in the baseline copy. This helps to shorten the overall duration of a file-based data migration operation, and also helps to avoid re-sync and sync-back operations during the incremental copy phase.

File-based data migration for NAS environments is more complex than block-based data migration. For file-based data migration, data blocks as well as index node (inode) data structures, metadata and stateful host access protocols need to be considered. File-based data migration technologies may transfer files in a phased approach, including a baseline copy phase and an incremental copy phase. File "hotness" (e.g., write access frequency) may be evaluated to determine whether files are assigned to the initial baseline copy used during the baseline copy phase or the later incremental copy used during the incremental copy phase. Conventional approaches for evaluating file hotness, however, are not dynamic and may not be accurate. Conventional approaches for file-based data migration, for example, may encounter a majority of defects from system test teams and customer reported issues. The technical solutions described herein provide a way to optimize file-based data migration to overcome technical problems with conventional approaches. For example, the technical solutions described herein can shorten the overall migration duration and avoid unnecessary traffic on the network through the use of a dynamic threshold window to determine the best datasets (e.g., the optimal files) for inclusion in the baseline copy and the incremental copy. The technical solutions also avoid unnecessary and complex logic at the incremental copy phase through generating a candidate dataset for the baseline copy which re-evaluates file hotness in a more dynamic, intelligent and precise way utilizing machine learning (e.g., DNN models).

Figure 3:
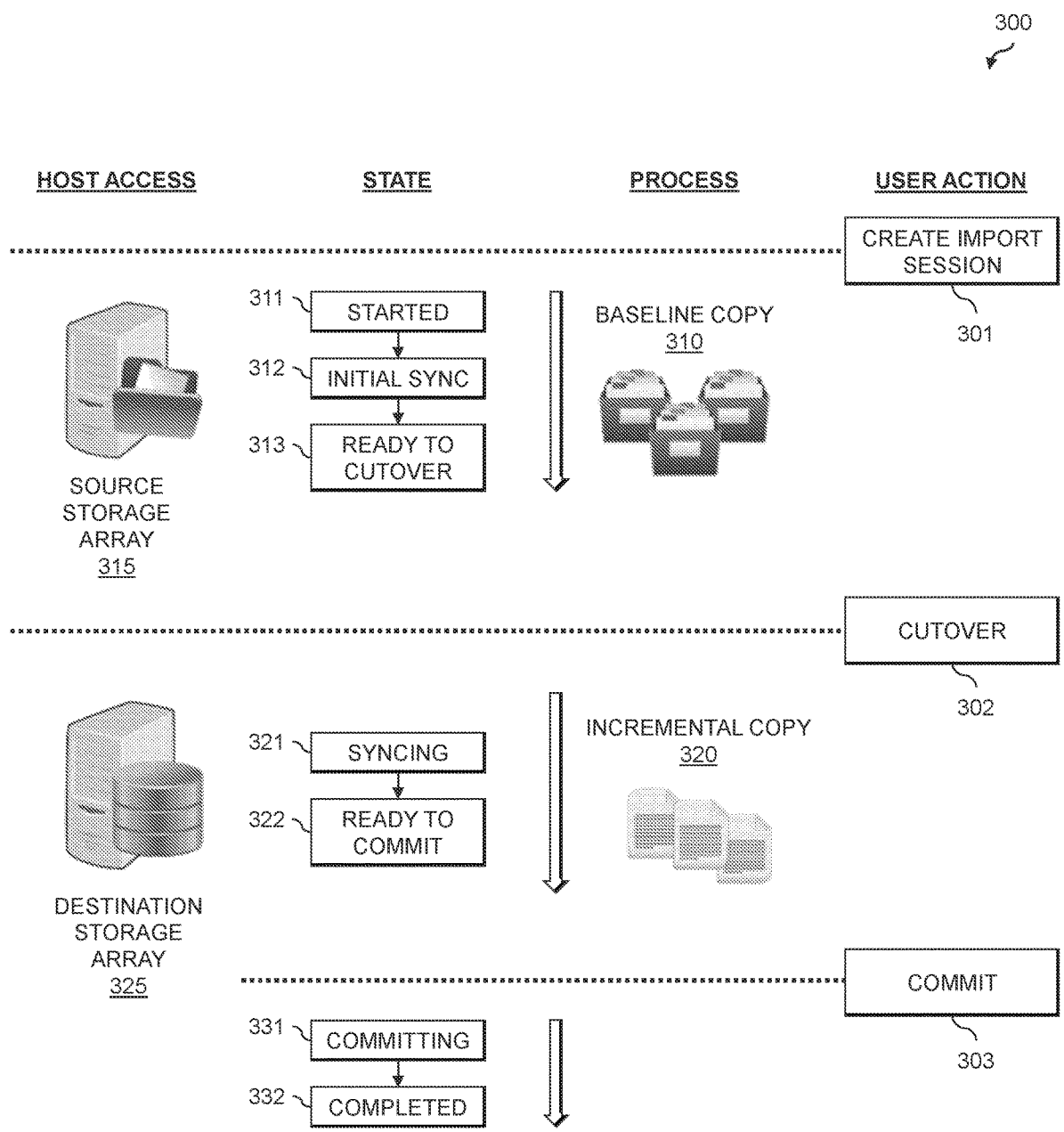
FIG. 3 shows a system flow of an in-band file data migration lifecycle in an illustrative embodiment.

FIG. 3 shows a file-based data migration system flow 300 which utilizes a phased approach. The system flow 300 shows host access, state, process and user actions in the phased approach. The system flow 300 begins in step 301 where a user creates an import session. This initiates generation of a baseline copy 310 to be transferred from a source storage array 315 to a destination storage array 325 during a baseline copy phase. The baseline copy phase includes states of started 311, initial sync 312 (e.g., of the baseline copy 310 from the source storage array 315 to the destination storage array 325), and ready to cutover 313. When the state is ready to cutover 313, the system flow 300 proceeds to cutover in step 302 and initiates an incremental copy phase where an incremental copy 320 is migrated from the source storage array 315 to the destination storage array 325. This includes states of syncing 321 and ready to commit 322. Once the destination storage array 325 is in the ready to commit 322 state, the system flow 300 proceeds to commit in step 303. This includes states of committing 331 and completed 332. The system flow 300 represents an in-band file data migration lifecycle.

The baseline copy 310 contains a copy of "cold" data which is not supposed to be modified during the initial baseline copy phase. In one approach, files with a file modification time (mtime) smaller than a migration connection initiation time minus some designated length of time (e.g., one hour) may be defined as "cold" files. After the baseline copy 310 is synced from the source storage array 315 to the destination storage array 325 and the system flow enters the ready to cutover state 313 (e.g., to the migration destination which is the destination storage array 325), the migration process needs to sync the "hot" data (e.g., data which was not copied as part of the baseline copy 310 in the baseline copy phase) from the source storage array 315 to the destination storage array 325. At the incremental copy phase, all write operations against the migrated data on the destination storage array 325 are synced back to the source storage array 315 so that any user changes will not be lost in case migration is cancelled. There are two components which may be responsible for this work, a "syncer" and a "mover." The syncer component makes sure that any new writes are saved in both the source storage array 315 and the destination storage array 325. The mover component moves any unmoved data from the source storage array 315 to the destination storage array 325.

At the incremental copy phase, files in the incremental copy 320 could be in various different states, such as none, pending, moving and moved. When all data is synced between the source storage array 315 and the destination storage array 325, the migration is in the ready to commit state 322. After commit in step 303, any new data updated on the destination storage array 325 (e.g. the new "production" storage array) is no longer synced back to the source storage array 315.

Conventional approaches for file-based data migration use static values to differentiate hot and cold data. After migration starts, cold data could become hot data, resulting in undesirable sync back operations. Although not every sync back operation is avoidable, it is desirable to reduce unnecessary data transfers between the source storage array 315 and the destination storage array 325, which will shorten the duration of the incremental copy phase. The incremental copy phase is much more complex than the baseline copy phase, especially when both mover and syncer components must work together. Thus, the longer duration of the incremental copy phase has a higher risk of data migration failure. The mover and syncer components, for example, must handle switched-over host access after cutover in step 302, and must synchronize modifications to the source storage array 315 and move any uncopied data to the destination storage array 325 after cutover in step 302 and before commit in step 303. The mover and syncer components also introduce locks to avoid conflicts.

Various examples of incremental copy defects will now be described. A split fix failure of "import session failed due to unrecoverable failure" may have a root cause where a mover cleans up a file with a hard link which results in entering a race condition where the inode was deleted but the data store entry was not updated. During incremental copy, one share can mount but can't be accessed, which may have a root cause of the number of rescheduled tasks reaching a maximum where the available number of tasks will not increase. An in-band mobility tool (IMT) session which failed for an unrecoverable error during incremental copy may have a root cause of conflicts between syncer and mover components. An error of, after cutting over a network file share (NFS) session one of the destination files or filesystems becoming inaccessible may have a root cause of the maximum number of mover threads being occupied by entries in a directory with such entries waiting for their parent directory to move first. If the parent directory is in the failed state and waiting to enter the mover queue, this will lead to destination files or filesystems becoming inaccessible.

It should be noted that the terms "syncer" and "mover" are used herein as examples of components involved in data migration processes. Different storage products, for example, may utilize different names or terms for components that perform similar processing for baseline and incremental copy operations. Further, the various defects described above are presented by way of example only to highlight issues associated with conventional approaches for file-based data migration.

The technical solutions in some embodiments provide an improved approach for evaluating "hotness" of files that leverages machine learning. For example, instead of relying solely on the past one hour access status of a file to determine the file's hotness, file write access frequency for a future baseline copy time period may be evaluated using DNN learning. The DNN learning advantageously takes into account multiple factors, including: using file write access counts of mtime (e.g., the last time a file's content was modified) and ctime (e.g., the last time that metadata related to a file was modified) to reflect both data and metadata modifications; considering the correlation between a file's read access and write access; considering the correlation between a file and its parent directory; considering the file type or extension of a file; and weighting file priority (e.g., in the case where a user desires to have customized data copy priority for different files).

The correlation between a file's read access and write access will now be discussed. A file with a high frequency for read access might have an increased probably of write access. For example, when filling in a survey document or an application spreadsheet, a user may read questions/titles carefully, think and review (e.g., which may include one or more read accesses), and then finally fill in the document or spreadsheet (e.g., which may include one or more write accesses). This relationship between file read and write access may be increased when considering shared files (e.g., a file shared amongst a team of users). For example, to finish a work plan document that is co-created or managed by multiple users, different users may read the document multiple times to understand and learn before writing in or completing different required parts or sections of the document.

The correlation between a file and its parent directory will now be discussed. A file might have an increased probability to be modified when its parent directory is modified or accessed. For example, a parent directory DIR_X may include 100 files under it, with one of them being a child file FILE_Y. When DIR_X is accessed, FILE_Y may have a high probability to be accessed in various scenarios. Directories, for example, may be defined and categorized by function, such as a directory named "notes" with multiple text (.txt) or document (.doc/docx) files which are most frequent to be accessed. This relationship between a file and its parent directory is thus helpful for predicting or evaluating file access frequency with improved accuracy in the future.

Different file types or file extensions might have different probabilities of write access. For example, compressed files (e.g., .tar.gz, .zip, etc.) files may have a lower probably of write access than other types of files such as executable (e.g., .exe) files.

Figure 4:
FIG. 4 shows a table of factors used for evaluating file hotness in an illustrative embodiment.

FIG. 4 shows a table 400 of different factors which may be taken into consideration by a DNN model to evaluate file hotness, such as the file write and read access counts in a historical time period T, file name extension, file associated parent inode's write and read access counts in the historical time period T, and file priority. A DNN model is used in some embodiments for machine learning and evaluation. As will be described in further detail below with respect to FIG. 6, the DNN model may be represented as a hierarchical (e.g., layered) organization of interconnected neurons (e.g., similar to neurons in the human brain). These neurons pass messages or signals to other neurons based on received input and from a complex network that learns with one or more feedback mechanisms.

The training sample dataset used for the DNN model may include file history behavior. First, an estimate of the period of time that at least a portion of a file-based data migration process will take (e.g., a time that the baseline data copy will take) is evaluated. In the description below, it is assumed that this time period (e.g., that the baseline data copy will take) is T. The various factors or attributes detailed above and shown in the table 400 of FIG. 4 are assumed to affect the write access count for a future instance of the time period T. Such factors include: (a) the write access count of a file in the last T period of time; (b) the read access count of the file in the last T period of time; (c) the file name extension of the file; (d) the associated parent inode's write access count of the file in the last T period of time; (e) the associated parent inode's read access count of the file in the last T period of time; and (f) the priority of the file.

In order to effectively train the DNN model, the attributes of the files are sampled in the last T period of time to construct the dataset. The initial dataset is obtained after n periods of sampling, and is represented as:

$$F=[(f_1,h_1),(f_2,h_2),\ldots,(f_n,h_n)]$$

Figure 5:
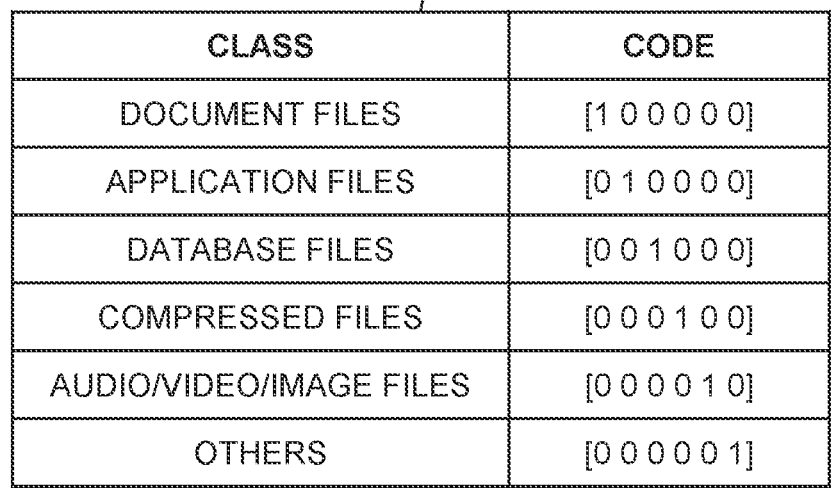
FIG. 5 shows tables for encoding of classes and priorities utilizing a one-hot encoding in an illustrative embodiment.
Figure 5:
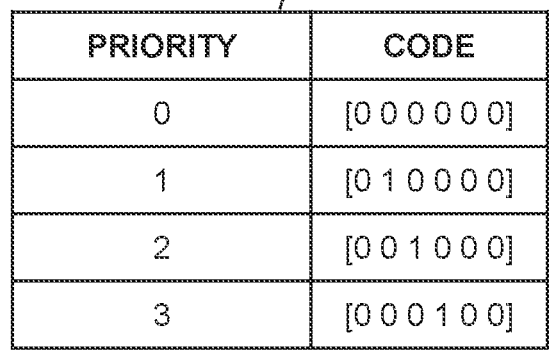

The attributes a, b, d and e are access counts, which should be an integer not less than 0. Since there are many possible file extensions, in some embodiments the file name extension attribute e divides file name extensions into a set of classes. For example, six classes may be used: document files (e.g., including text files, data files, email fails, spreadsheet files, etc.); application files (e.g., including executable files, web files, programming files, system files, etc.); database files; compressed files; audio, video and image files; and other files. A one-hot encoding may be used to encode these six classes, as illustrated in the table 500 of FIG. 5. Similarly, the file priority attribute f may be broken up into a set of priority levels. For example, four priorities may be used and a one-hot encoding may be used for the different priorities as illustrated in the table 505 of FIG. 5. The features of a file $F_i$ may thus be represented as:

$$F_i = \begin{bmatrix} & & c_i & & & \\ & & f_i & & & \\ a_i & b_i & d_i & e_i & 0 & 0 \end{bmatrix}$$

For example, during the last T period of time, the file $F_i$ may have a read access count of 4, a write access count of 4, its parent may have a write access count of 5 and a read access count of 3, the file may belong to the database file category and may have a priority of 3. The features of the file $F_i$ can thus be represented as:

$$f_i = \begin{bmatrix} 0 & 0 & 1 & 0 & 0 & 0 \\ 0 & 0 & 0 & 1 & 0 & 0 \\ 4 & 4 & 5 & 3 & 0 & 0 \end{bmatrix}$$

The label of a file is the write access count in the next T period of time, represented as $h_i$.

In order to balance the impact of categories and features for the DNN model, the counts of the accesses may be normalized such that all counts are decimals between 0 and 1. After normalization, the features of the example file $F_i$ are represented as:

$$f_i = \begin{bmatrix} 0 & 0 & 1 & 0 & 0 & 0 \\ 0 & 0 & 0 & 1 & 0 & 0 \\ 0.8 & 0.8 & 1 & 0.6 & 0 & 0 \end{bmatrix}$$

The label should be $h_i \in [0, 1]$. After the above processing, the desired dataset is obtained. In order to select a better model, this dataset is divided into two parts, with 70% of the dataset being used as the training data and 30% of the dataset being used as the verification data. Therefore, there are training data X, labels Y, validation data X', and labels Y':

$X=[f_1, f_2, \ldots, f_i]$ $Y=[h_1, h_2, \ldots, h_i]$ $X'=[f_{i+1}, f_{i+2}, \ldots, f_n]$ $Y'=[h_{i+1}, h_{i+2}, \ldots, h_n]$ The DNN has high complexity, but the correlation between hidden layers is higher which can effectively fit the input data. The dimension of the data used in the training model is relatively simple, and thus a DNN model can be used. In order to better fit the data, in some embodiments the DNN model uses three layers or more. In order to prevent losing effective features, the DNN model may use five layers or less. In real-world scenarios, a user can adjust the number of layers of the DNN model through the validation dataset.

Figure 6:
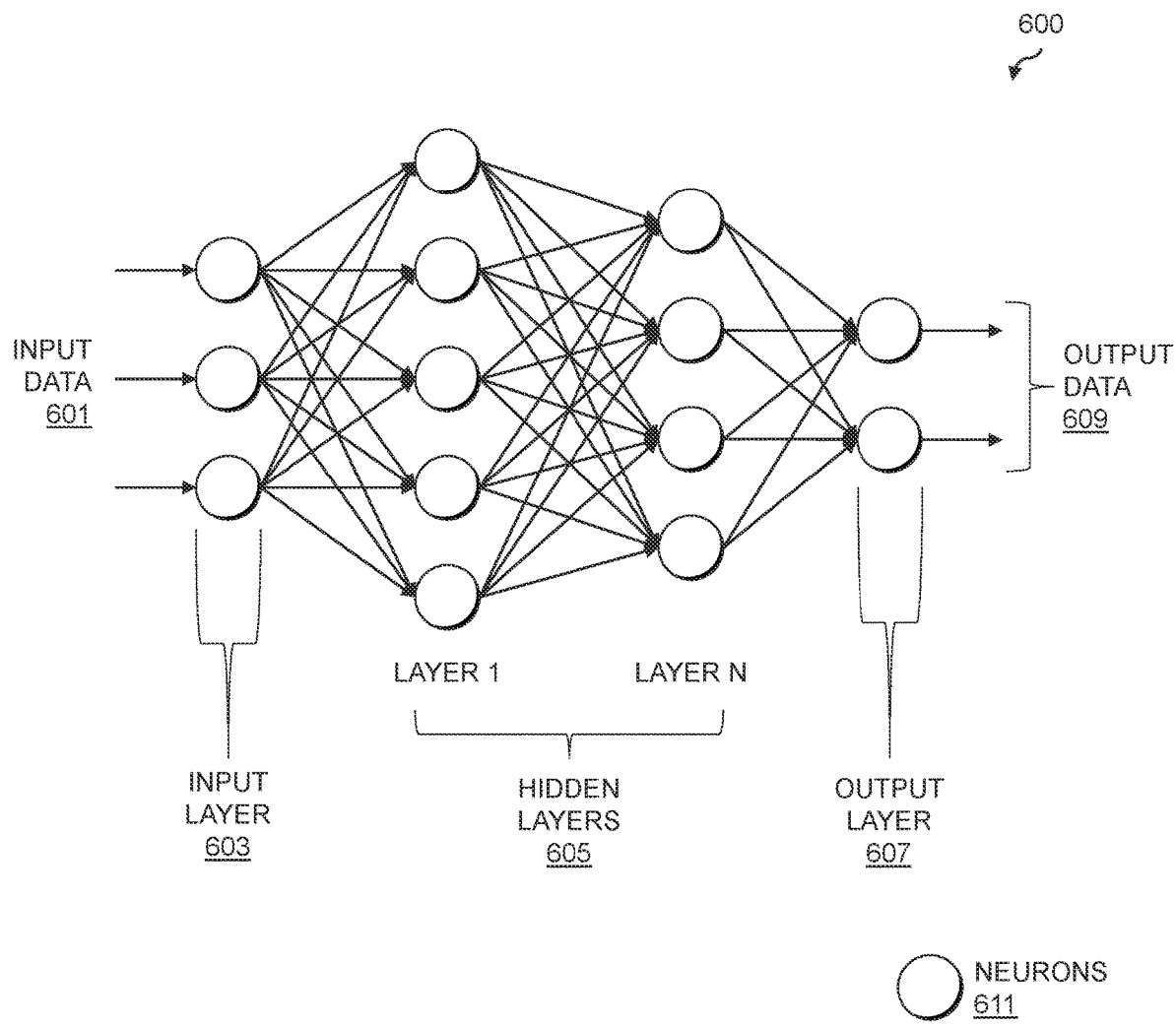
FIG. 6 shows an architecture of a deep neural network model with multiple hidden layers in an illustrative embodiment.

FIG. 6 shows a sample architecture 600 of a DNN model that receives input data 601 at an input layer 603, includes a set of N hidden layers 605, and has an output layer 607 providing output data 609. The architecture 600 includes various neurons 611 in the different layers as shown. Since the input data 601 in some embodiments is a decimal between 0 and 1, and its value may be equal to 0 or 1, a smooth LI loss function may be used as the loss function, assuming the output of the DNN model is h'. The loss function may thus be represented as:

$$L = \begin{cases} 0.5(h-h')^2 & \text{if } |h-h'| < 1 \\ |h-h'| - 0.5 & \text{otherwise} \end{cases}$$

The DNN algorithm process includes training, validation and tuning. During training, the extracted features are input to the neural network to calculate the loss. An Adam optimizer may be used to optimize the gradient descent algorithm in some embodiments, and training may be ended when the loss is less than some designated threshold (e.g., less than 10%). After the training, the data in the validation set is input and the accuracy rate is calculated utilizing the labels in the validation set. If the accuracy rate is less than some designated threshold (e.g., less than 85%), the learning rate and/or the number of hidden layers of the DNN model may be adjusted and the DNN model may be retrained. Tuning is performed after the DNN model is used, where the accuracy of predictions is collected and error predictions are used to tune the DNN model.

In some embodiments, a threshold window is defined for the baseline copy. In some approaches, a threshold of whether the mtime is smaller than the migration connection creation time minus one hour (e.g., files that have no write accesses in the past hour) is used to define "cold" files. This threshold definition is only based on file write access count. However, when considering the set of files for inclusion in the baseline copy, files should be cold enough to avoid or reduce sync-back work in the future during the incremental copy. In addition, the total sum size of the files in the baseline copy (e.g., the initial copy stage) should be reasonably big enough so that there aren't too many files assigned to the incremental copy stage, which can greatly influence the overall file-based data migration process duration. The technical solutions described herein thus utilize a new threshold window definition to introduce a dynamic threshold model. The new threshold window definition is integrated with multiple factors, including predicted file write access count and a total sum size percentage of files in the baseline copy.

Figure 7A:
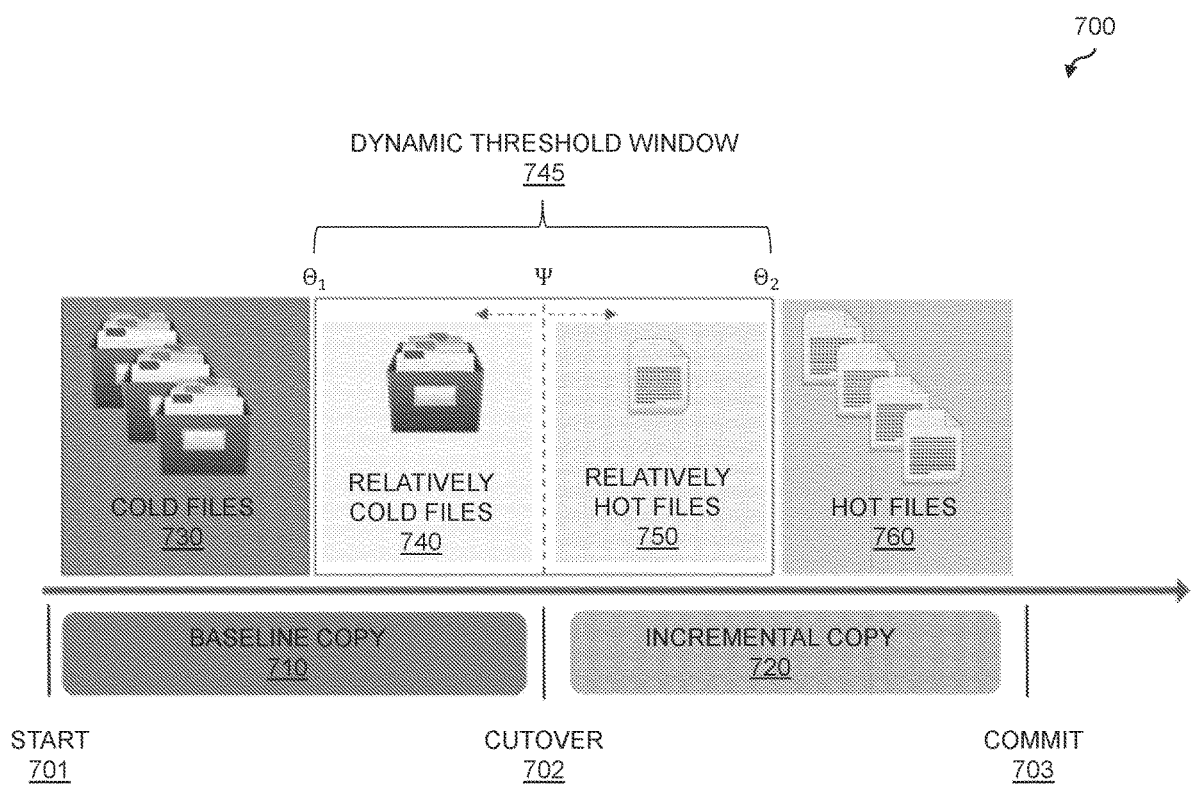
FIGS. 7A and 7B shows a dynamic threshold window for selecting files for inclusion in baseline and incremental copies along with a table of factors for different categories of files relative to the dynamic threshold window in an illustrative embodiment.

FIG. 7A shows an example implementation 700 of a dynamic threshold window 745. Here, the baseline copy phase starts in step 701, followed by an incremental copy phase following cutover in step 702. When the incremental copy phase is completed, the file-based data migration is committed in step 703. The dynamic threshold window 745 is defined by lower and upper limits $\Theta_1$ and $\Theta_2$, along with a size percentage threshold $\Psi$. $\Psi$ represents the size percentage threshold of the total sum of files selected for inclusion in a baseline copy 710. For example, if $\Psi=70\%$ and all data in storage is 10 terabytes (TB), then at least 70%*10 TB=7 TB size of data files should be selected for inclusion in the baseline copy 710. Using the thresholds $\Theta_1$, $\Theta_2$ and $\Psi$, files may be divided into four categories, cold files 730, relatively cold files 740, relatively hot files 750, and hot files 760.

Figure 7B:

Cold files 730 (e.g., cold "enough" files with a low probability of requiring sync-back work during the incremental copy phase) are those with predicted write access counts in the future time period T below the lower limit $\Theta_1$. Hot files 760 are those with predicted write access counts in the future time period T above the upper limit $\Theta_2$, and should not be selected for inclusion in the baseline copy 710. Files with predicted write access counts in the future time period T between the lower limit $\Theta_1$ and the upper limit $\Theta_2$ are either relatively cold files 740 or relatively hot files 750. The relatively cold files 740 are those with the lowest predicted write access counts in the future time period T between the lower limit $\Theta_1$ and the upper limit $\Theta_2$ which are selected for inclusion in the baseline copy 710 until the threshold size limit Y' is reached. The remaining files with predicted write access counts in the future time period T between the lower limit $\Theta_1$ and the upper limit $\Theta_2$ which are not selected for inclusion in the baseline copy 710 (e.g., as the threshold size limit Ψ is reached by inclusion of the relatively cold files 740 in the baseline copy 710 along with the cold files 730) are the relatively hot files 750. The relatively hot files 750 and the hot files 760 are included in the incremental copy 720. FIG. 7B shows a table 775 illustrating the cold, relatively cold, relatively hot and hot file categories along with their respective definitions.

Figure 8:
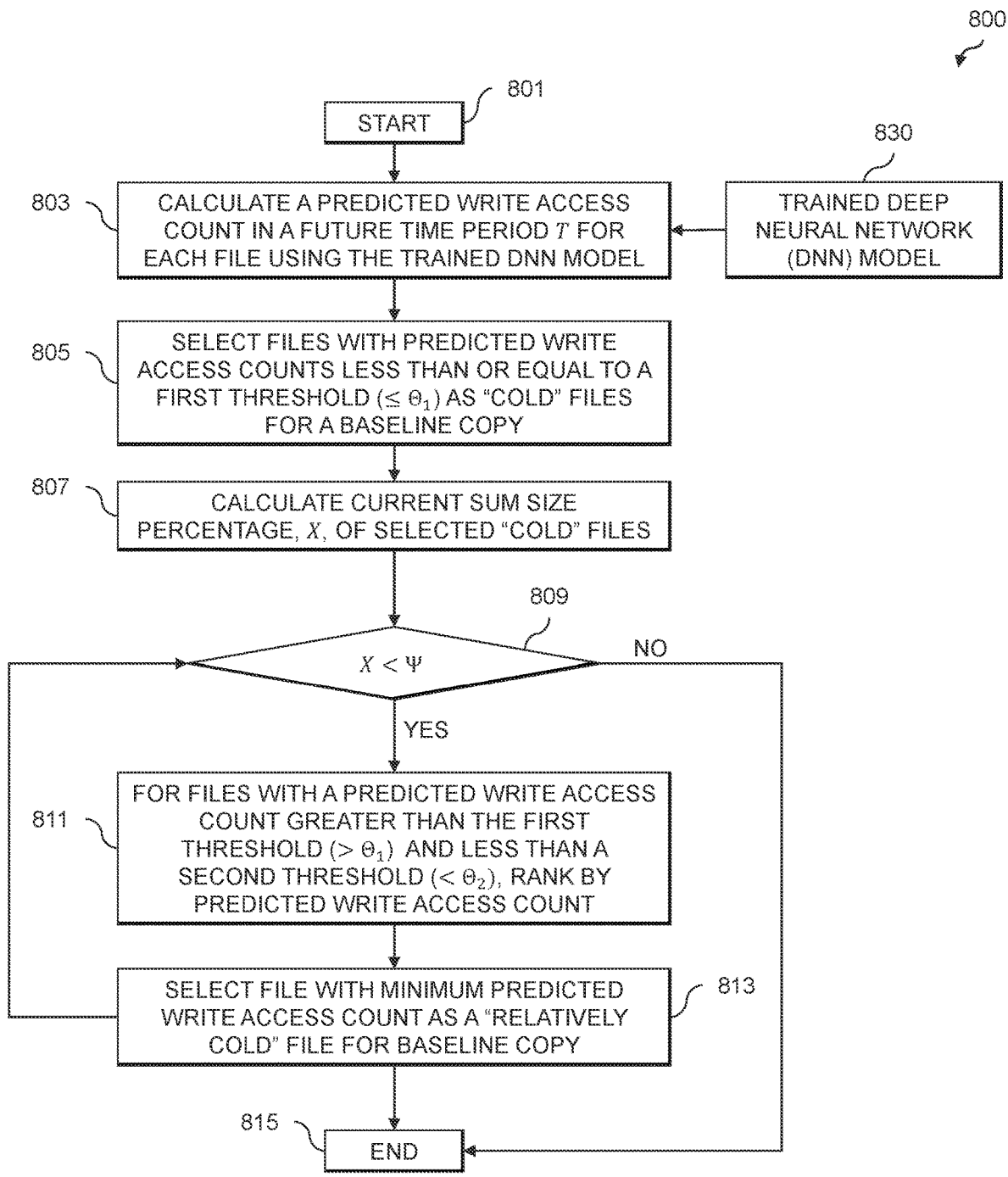
FIG. 8 shows a process flow for selecting files for inclusion in a baseline copy used for file data migration in an illustrative embodiment.

FIG. 8 shows a process flow 800 for intelligently selecting the dataset for an optimized file-based data migration process. The process flow 800 utilizes DNN-based file write access count evaluation and a dynamic threshold window. The process flow 800 starts in step 801. In step 803, a trained DNN model 830 is used to determine predicted write access counts for files in a future time period (e.g., a future initial baseline data copy time). The time period T that the baseline data copy will take is evaluated. The DNN model is then trained 830 and used to predict the write access count in the future time period T for each file in step 803. Files with a write access count less than or equal to the lower limit $\Theta_1$ are selected as the "cold enough" files for the baseline copy in step 805. The sum size percentage of the cold enough files is then calculated in step 807. In step 809, a determination is made as to whether the sum size percentage of the files selected for inclusion in the baseline copy is less than the threshold Ψ. If the result of the step 809 determination is yes, then files with predicted write access counts belonging to the interval [$\Theta_1$, $\Theta_2$] are ranked by their predicted write access counts in step 811. A file with the minimum or lowest predicted write access count is selected as a "relatively cold" file and is included in the baseline copy in step 813. The process flow 800 then returns to the step 809 determination. Steps 809 through 813 are then repeated while the sum size percentage of files selected remains less than the threshold Ψ'. Once the result of the step 809 determination is no, the process flow 800 ends in step 815.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for multi-phase file-based data migration will now be described in greater detail with reference to FIGS. 9 and 10. Although described in the context of system 100, these platforms may also be used to implement at least portions of other information processing systems in other embodiments.

Figure 9:
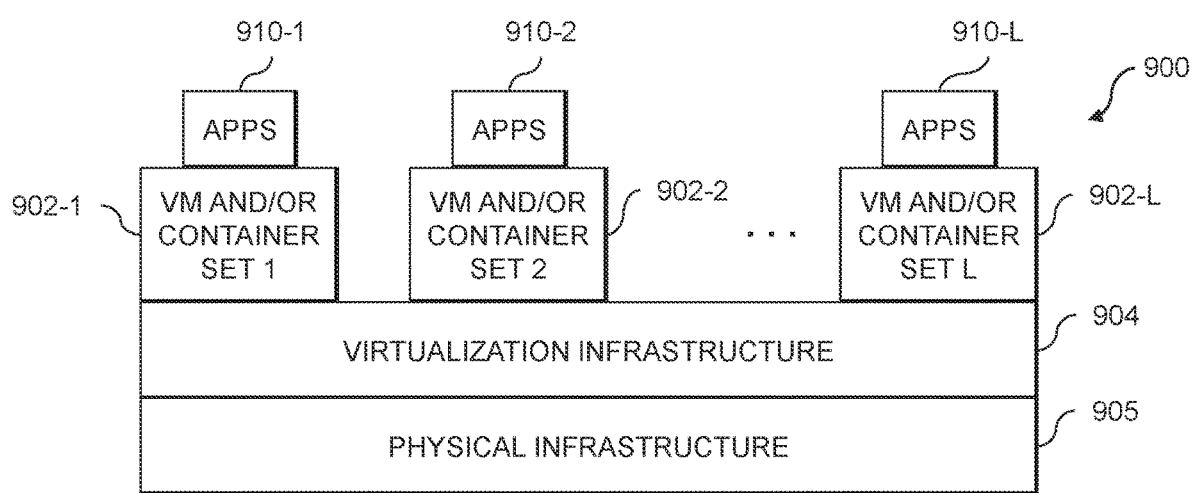
FIGS. 9 and 10 show examples of processing platforms that may be utilized to implement at least a portion of an information processing system in illustrative embodiments.
Figure 10:
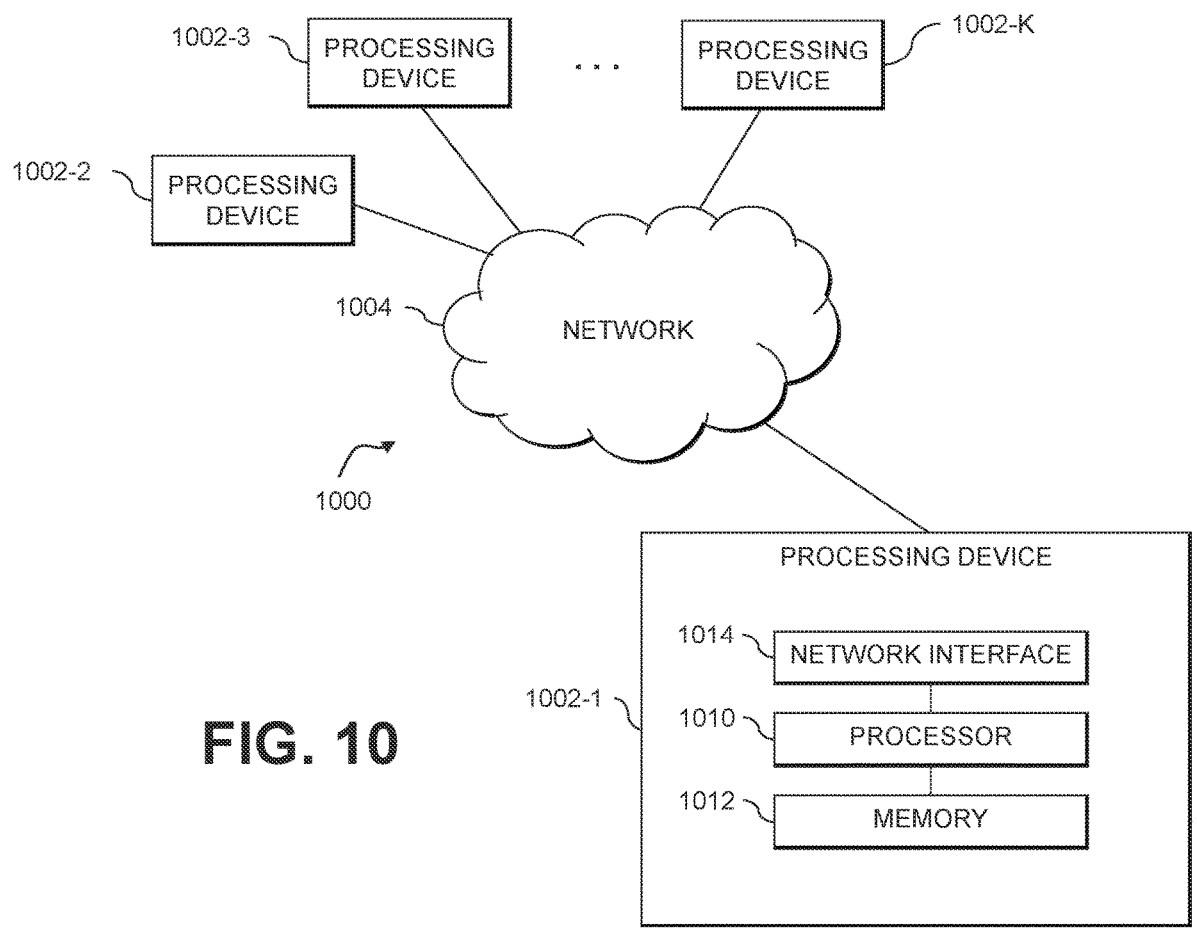

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for multi-phase file-based data migration as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      determining, for a given time period corresponding to an expected duration of a multi-phase file-based data migration from a source storage system to a destination storage system, predicted write access count metrics for a plurality of files to be migrated as part of the multi-phase file-based data migration;
      selecting, based at least in part on the predicted write access count metrics, a first subset of the plurality of files for migration during a first phase of the multi-phase file-based data migration and a second subset of the plurality of files for migration during a second phase of the multi-phase file-based data migration;
      migrating, from the source storage system to the destination storage system, the selected first subset of the plurality of files during the first phase of the multi-phase file-based data migration; and
      migrating, from the source storage system to the destination storage system, the selected second subset of the plurality of files during the second phase of the multi-phase file-based data migration;
   wherein the first phase of the multi-phase file-based data migration comprises a baseline copy phase and the second phase of the multi-phase file-based data migration comprises an incremental copy phase;
   wherein the first subset of the plurality of files comprises files having predicted write access count metrics below a first threshold value; and
   wherein the second subset of the plurality of files comprise files having predicted write access count metrics above a second threshold value.

2. The apparatus of claim 1 wherein during the incremental copy phase write access requests are synchronized in the source storage system and the destination storage system.

3. The apparatus of claim 1 wherein selecting the first and second subsets of the plurality of files for migration during the first and second phase of the multi-phase file-based data migration comprises splitting the plurality of files into two or more different categories based on a set of threshold values including the first threshold value and the second threshold value.

4. The apparatus of claim 3 wherein the two or more different categories comprise:
   a first file category comprising files having predicted write access count metrics, in the given time period, below the first threshold value;
   a second file category comprising files having predicted write access count metrics, in the given time period, above the second threshold value; and
   a third file category comprising files having predicted write access count metrics, in the given time period, between the first threshold value and the second threshold value.

5. The apparatus of claim 4 wherein files in the first file category are selected for inclusion in the first subset and files in the second file category are selected for inclusion in the second subset.

6. The apparatus of claim 5 wherein the set of threshold values further comprises a third threshold value corresponding to a maximum size of the first subset of the plurality of files, and wherein responsive to a total size of the files in the first file category being less than the third threshold value, one or more of the files in the third file category are selected for inclusion in the first subset.

7. The apparatus of claim 6 wherein the one or more files in the third file category selected for inclusion in the first subset are selected based at least in part on ranking the predicted write access count metrics for the files in the third file category.

8. The apparatus of claim 1 wherein determining the predicted write access count metrics comprises utilizing a deep neural network model comprising two or more hidden layers.

9. The apparatus of claim 1 wherein determining the predicted write access count metrics is based at least in part on: (i) correlations between file read and write access; (ii) correlations between files and associated parent directories; and (iii) file type.

10. The apparatus of claim 1 wherein determining the predicted write access count metrics is based at least in part on:
read and write access count metrics for the plurality of files in a historical time period; and
read and write access counts for parent directories of the plurality of files in the historical time period.

11. The apparatus of claim 10 wherein a duration of the historical time period is the same as a duration of the given time period.

12. The apparatus of claim 1 wherein determining the predicted write access count metrics is based at least in part on file name extensions of the plurality of files.

13. The apparatus of claim 1 wherein determining the predicted write access count metrics is based at least in part on user-defined priorities of the plurality of files.

14. The apparatus of claim 1 wherein the baseline copy phase is associated with a dynamic threshold window determined based at least in part on the predicted write access count metrics and a total sum size percentage of the plurality of files.

15. A computer program product comprising a non-transitory processor-readable storage medium having stored therein program code of one or more software programs, wherein the program code when executed by at least one processing device causes the at least one processing device to perform steps of:
determining, for a given time period corresponding to an expected duration of a multi-phase file-based data migration from a source storage system to a destination storage system, predicted write access count metrics for a plurality of files to be migrated as part of the multi-phase file-based data migration;
selecting, based at least in part on the predicted write access count metrics, a first subset of the plurality of files for migration during a first phase of the multi-phase file-based data migration and a second subset of the plurality of files for migration during a second phase of the multi-phase file-based data migration;
migrating, from the source storage system to the destination storage system, the selected first subset of the plurality of files during the first phase of the multi-phase file-based data migration; and
migrating, from the source storage system to the destination storage system, the selected second subset of the plurality of files during the second phase of the multi-phase file-based data migration;
wherein the first phase of the multi-phase file-based data migration comprises a baseline copy phase and the second phase of the multi-phase file-based data migration comprises an incremental copy phase;
wherein the first subset of the plurality of files comprises files having predicted write access count metrics below a first threshold value; and
wherein the second subset of the plurality of files comprise files having predicted write access count metrics above a second threshold value.

16. The computer program product of claim 15 wherein determining the predicted write access count metrics is based at least in part on: (i) correlations between file read and write access; (ii) correlations between files and associated parent directories; and (iii) file type.

17. The computer program product of claim 15 wherein the baseline copy phase is associated with a dynamic threshold window determined based at least in part on the predicted write access count metrics and a total sum size percentage of the plurality of files.

18. A method comprising:
determining, for a given time period corresponding to an expected duration of a multi-phase file-based data migration from a source storage system to a destination storage system, predicted write access count metrics for a plurality of files to be migrated as part of the multi-phase file-based data migration;
selecting, based at least in part on the predicted write access count metrics, a first subset of the plurality of files for migration during a first phase of the multi-phase file-based data migration and a second subset of the plurality of files for migration during a second phase of the multi-phase file-based data migration;
migrating the selected first subset of the plurality of files during the first phase of the multi-phase file-based data migration; and
migrating the selected second subset of the plurality of files during the second phase of the multi-phase file-based data migration;
wherein the first phase of the multi-phase file-based data migration comprises a baseline copy phase and the second phase of the multi-phase file-based data migration comprises an incremental copy phase;
wherein the first subset of the plurality of files comprises files having predicted write access count metrics below a first threshold value;
wherein the second subset of the plurality of files comprise files having predicted write access count metrics above a second threshold value; and
wherein the method is performed by at least one processing device comprising a processor coupled to a memory.

19. The method of claim 18 wherein determining the predicted write access count metrics is based at least in part on: (i) correlations between file read and write access; (ii) correlations between files and associated parent directories; and (iii) file type.

20. The method of claim 18 wherein the baseline copy phase is associated with a dynamic threshold window determined based at least in part on the predicted write access count metrics and a total sum size percentage of the plurality of files.

* * * * *